Aug. 27, 1963

C. S. BROWN 3,101,737

SEWER REGULATOR OPERATING APPARATUS

Filed April 10, 1962

INVENTOR.
Chalmers S. Brown
BY
ATTORNEY

Aug. 27, 1963  C. S. BROWN  3,101,737
SEWER REGULATOR OPERATING APPARATUS
Filed April 10, 1962  2 Sheets-Sheet 2

INVENTOR.
Chalmers S. Brown
BY
ATTORNEY

United States Patent Office 3,101,737
Patented Aug. 27, 1963

3,101,737
SEWER REGULATOR OPERATING APPARATUS
Chalmers S. Brown, Lima, Ohio, assignor to Brown & Brown, Incorporated, Lima, Ohio, a corporation of Ohio
Filed Apr. 10, 1962, Ser. No. 186,374
3 Claims. (Cl. 137—416)

My invention concerns an apparatus for operating a sewer regulator gate and, particularly, one which is auxiliary to the primary regulator gate operating apparatus.

As is known to those skilled in the art, the need to regulate sewer flow arises, as when sewerage input exceeds the capacity, for example, of a downstream treatment plant and a delay or diversion of the sewer flow to other parts of the sewer system can operate to relive the situation. High water, particularly, that induced by so called "flash" floods, bring high sewer input and very often a need to regulate the sewer flow.

The function of regulation is performed in regulators which essentially comprise a segment of the sewer system, being usually a chamber through which the sewer flow flows. Regulators of various kinds and for various purposes are shown in my United States Letters Patents Nos. 1,969,964; 2,062,390; 2,150,359 and 2,882,919.

Essentially, a regulator includes a gate valve element that is mounted for movement from open to closed positions over a downstream connected orifice or flume, either entering or leaving the chamber, thus to control continued downstream flow from the regulator to the outfall end of the sewer system, and a means for moving the gate valve element to and from its open and closed positions. In "automatic" regulators, like those shown in the patents mentioned, such means may include that which is actuated by sewer flow, such as a float element operatively connected to the gate valve element, and which rises and falls as sewer flow rises and falls.

Automatic regulators, as their name suggests, do not normally require supervision, for after high water and as the sewer flow diminishes, the float element that actuates the gate valve element also falls and thereby lifts the gate valve element to open position to thus reestablish normal flow conditions sometimes called "dry weather" flow, through the regulator. When, however, silt and waste, commonly carried in the sewer flow, is deposited on or between critical operating parts of the float or gate valve elements, these elements may become locked or jammed, preventing the elements from moving automatically as designed.

In my United States Letters Patent No. 3,022,666, I suggest means by which the float element may be supported to be free of this difficulty and threat. It is the principal object of this invention to teach means by which jamming of the gate valve element may be overcome and the regulator thereby rendered more reliably automatic.

Another important object of my invention is to teach means that exerts a jam overcoming pressure on the gate valve element only at such times as the gate valve element is in a position with reference to the edges of the orifice it controls to become jammed therewith. By such provision, the operation of the primary gate valve element operating apparatus, namely the float element, may in all other respects be normal and the weight and operational provisions thereof be held to the heretofore well established constant. This also allows ready installation of means embodying my invention on regulators already in the field without a costly reworking and replacement of parts.

Still another important object of my invention is to teach means of the character mentioned in which the power to actuate such jam overcoming means is generated in the movement of the gate valve element relative to its open and close positions. By such provision, need for an extraneous source of power is eliminated and the installation, as well as the maintenance, cost of such means is materially reduced.

A further object of the invention is to teach the proversion of a means, embodied as in cam or collar in engagement and movable with one of the regulator elements, either the gate valve, float or the transmission connecting the float and gate valve together with a movable means embodied as in the free end of a leaf spring arm, disposed in the path of movement of the cam or collar means as to be engaged thereby when and only when the regulator elements are moved in the course of the closing increment of gate valve movement and to exert a bias tending to urge the gate valve element to open, thereby to aid the initial actuation thereof by the float element.

The invention has other and further objects among which are those of providing other advantageous structures and arrangements which will appear from the following description and from an examination of the accompanying drawings. Sewer regulator operating apparatus containing my invention may take various forms, one of which appears now to me to be the best mode by which the teachings of my invention may be carried out. I shall describe that form and in doing so will make reference to the accompanying drawings. However, I do not imply, by such description and reference, that variation from such described or illustrated form is beyond the contemplation of any invention I may make manifest herein.

Figure 1:
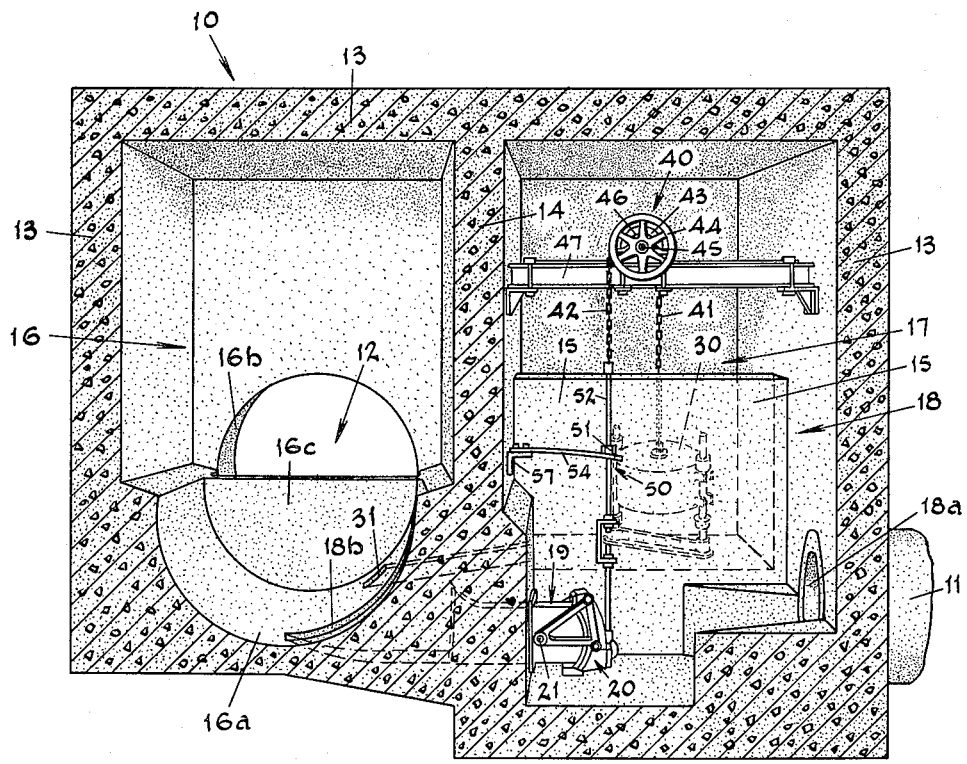
FIG. 1 illustrates a perspective view of a regulator in a sewer system, in which some parts are shown cut or broken away to aid the showing of structure details and in which an embodiment of my invention is advantageously installed.

In FIG. 1 of the drawings, I show a regulator, indicated generally at 10, into which flow from a combined storm and sanitary main sewer 12 enters. When such flow is of the magnitude of dry-weather flow and below some predetermined crest, the entire incoming flow is diverted in the regulator 10 to an outfall pipe 11 and thence mayhap to an interceptor or sewerage treatment plant. Arrangements within the regulator 10, which will be shortly described, are such that when flow conditions in the main sewer 12 effect a greater than dry-weather flow, as in flood stages, the passage, by which flow from the main sewer 12 passes into the interceptor 11, is closed and remains closed until flow conditions in the main sewer 12 again resume the flow height of a dry-weather flow.

The regular 10 has a housing wall 13, the interior of which is partitioned by cross wall 14 and dividing wall 15 to form a main chamber 16, a float chamber 17, and a gate chamber 18. The wall 13 has upstream opening 16a, downstream opening 16b, and a gate chamber opening 18a.

The upstream end of the main sewer 12 connects with opening 16a and the downstream end of the main sewer connects with opening 16b so that the chamber 16 forms a segment in the main sewer system.

The outfall pipe 11 connects with opening 18a so to receive and conduct flow from the gate chamber 18. In order that flow into the gate chamber 18 from the main sewer 12 may occur, the wall 14 has an opening 18b which leads from the main chamber 16 into the gate chamber 18, preferably from a point in the main chamber proximate the downstream side thereof.

Preferably, a dam 16c extends across the floor of the main chamber 16. The dam 16c is downstream from the opening 18b and is of a height that is substantially less than that to which flow through chamber 16 reaches under flood conditions and slightly higher than that at which flow through chamber 16 is in dry-weather flow condition. Thus, the dam 16c assures that flow at heights less than the dam will be diverted to chamber 18 and to the outfall pipe 11.

The opening 18b may be fitted, as shown in the drawings, with a flume 19. The flume not only conveys dry-weather flow from the main chamber 16 into the gate chamber 18 but also provides mounting and seating means to support and cooperate with a shutter or gate valve element 20 in regulating that flow.

The gate valve element 20 is conventional in structure, being supported, as by trunnions 21 on the sides of the flume 19, for substantially vertical arcuate reciprocation from open to closed positions over the gate chamber end of the flume 19. In order to close the flume 19 against substantial flow from chamber 16, as when the gate valve element 20 is in a closed position, the element 20 has a valve face 22 that mates, particularly in its perimeter zones, with a seating edge 23 formed or provided on the gate chamber end of the flume 19. As shown, the valve face 22 and seating edge 23 are arcuate to allow the gate valve element to move as before mentioned, substantially vertically and arcuately on the trunnions 21 from closed to open positions and return.

That flow between the valve face and seating edge shall be held within a practical minimum and at the same time there be such clearance between the valve face and seating edges as will allow ready movement of the valve element from closed and open position, the edge 23 and face 22 are constructed and mounted so as to have some but only a minimum clearance between them. Such fitting of the valve face and seat, although adequate to regulate flow, allows an unimportant trickle of sewerage to pass between the gate and flume edge. The silt and waste carried by the trickling sewerage tends to deposit and lodge between the valve face 22 and seating edge 23. Its presence is likely to and does often cause the gate valve element to become jammed with the edge 23. When this happens the gate valve element is locked in closed position and held against opening through operation of the customary opening means.

The flume 19 may support a stop lip 24, proximate the lower edge of the gate chamber end of the flume. The lip 24 is adapted to engage the gate valve element 20, after it reaches its closed position and will, when so engaging, sustain the weight of the gate valve element and such counter weights 25 as may be mounted on the gate valve element.

In order to operate the gate valve element 20 and to move it to and from and there sustain it in its open and closed positions, a float element 30 is provided. The float element 30, which may be of the well known and conventional structure, occupies the float chamber 17 and is responsive, by rising and falling, to the rise and fall of sewer flow in and out of the float chamber. Sewer flow enters and leaves the float chamber 17 through a telltale passage 31. The telltale extends through the wall 14 and provides communication with the main chamber 16, particularly at a point near the upstream end thereof. Thus, as flow conditions in the main sewer 12 and through the main chamber 16 produce a higher flow head than that of dry-weather flow, the sewerage enters the float chamber 17 through the telltale 31 and causes the float element 30 to rise. When, however, flow in the main sewer 12 returns to normal, the sewerage in the float chamber 17 leaves the chamber and the float element 30 falls.

So that this movement of the float element 30 may be advantageously applied to moving the gate valve element 20, I provide a transmission train element 40. The transmission train element shown in the accompanying drawings is well known in form and structure. It includes transmission lines or chains 41 and 42, transmission rocker arms or sprockets 43 and 44, a transmission shaft 45 and suitable journals 46 and supporting beams 47 mounted in the float and gate valve chambers, as shown. The chain 41 has one end connected to the float element 30 and its other end to the sprocket 43. The sprocket 43 is keyed to and is supported high in the float chamber by the shaft 45 which rests in journals 46 on beams 47 suitably mounted across and high in the chambers 17 and 18 and support the shaft 45 extending over the top of the wall 15. The other sprocket 44 is also keyed to the shaft 45 near the end thereof high in the gate valve chamber 18. The upper end of the chain 42 is connected to the sprocket 44 and the lower end of the chain 42 is linked to the gate valve element 20.

Assuming the chains 41 and 42 and the latter's linkage are of proper lengths in reference to the expectant stroke of the float element 30 and with due regard to the mechanical ratio existing between the sprockets 43 and 44, the rising motion of the float element 30, in response to sewer flow into the float chamber 17, will allow the gate valve element 20 to fall toward its closed position. The downward movement of the gate valve element draws chain 42 from around the sprocket 44 causing rotation of the shaft 45 and sprocket 43. Rotation of the sprocket 43 gathers bights of the chain 41 about the sprocket 43. Now when the sewerage leaves the float chamber 17, the float element 30 will fall drawing the bights of chain 41 from the sprocket 43. This causes rotation of the shaft 45 and of the sprocket 44 in a direction to gather chain 42 in bights thereabout. The gathering of the chain 42 tends to lift the gate valve element 20 to an open position. In actual operations in the field, I find that the float element and gate valve element are best operated when each are sized and burdened (as by counter weights 25 and the like) to produce an exact counter balance therebetween, when the float element 30 floats immersed in sewerage within the float chamber 17 to a depth of about two inches. Should, however, the gate valve element 20 become jammed due to deposit and lodging of silt or sediment carried by the sewerage between the valve face 22 and seating edges 23, the desired counter balance between the float and gate valve elements will be upset.

Figure 4:
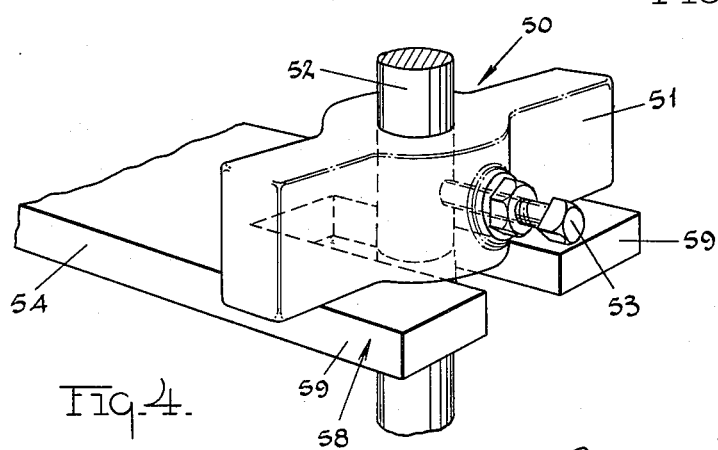
FIG. 4 is an enlarged view in perspective of certain of the critical parts shown in FIGS. 2 and 3.
Figures 2, 3:
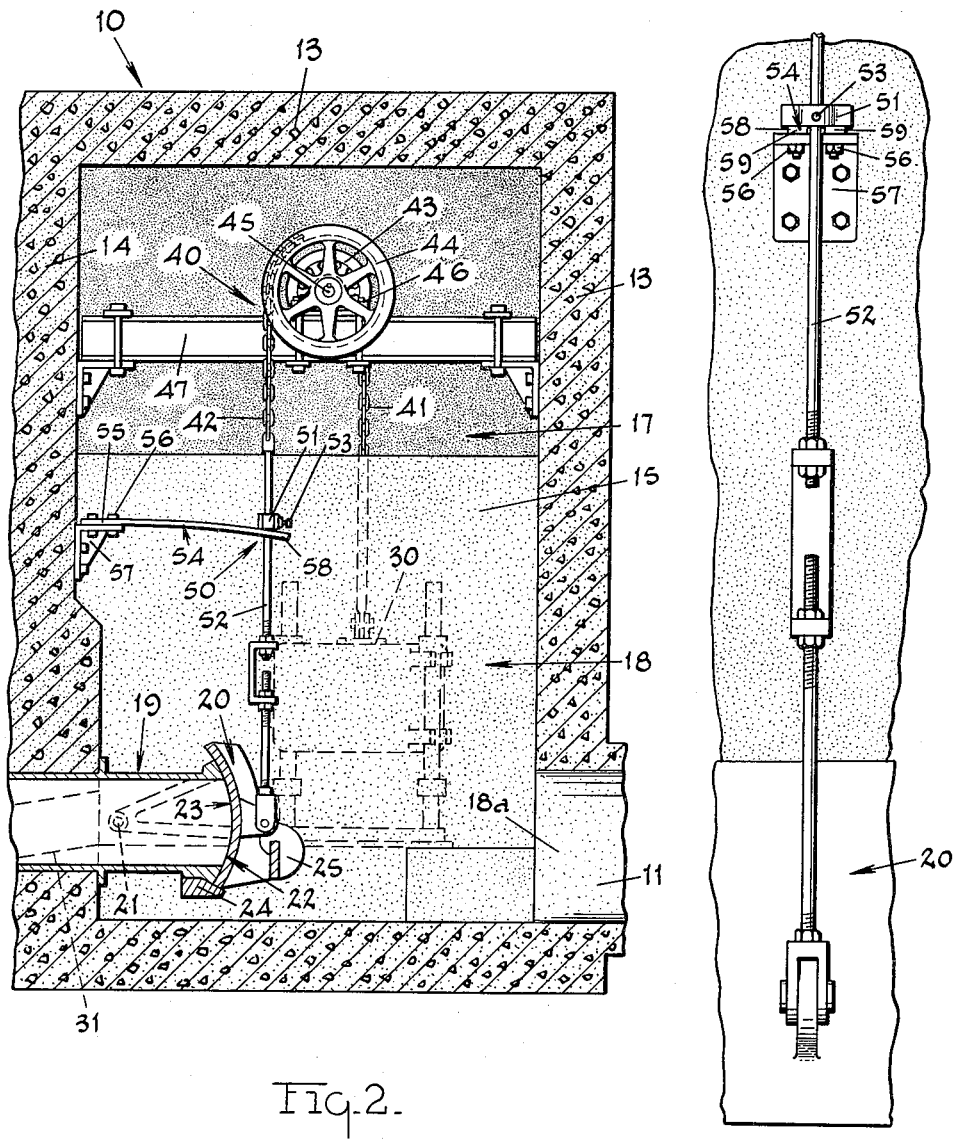
FIG. 2 is an enlarged view, in elevation, of certain parts shown in FIG. 1.
FIG. 3 is a view, in elevation, of the parts shown in FIG. 2 viewed, however, at right angle to the view shown in FIG. 2.

What I have so far described contitutes the background within which the improvement provided by my invention best functions. Referring particularly to FIGS. 2, 3 and 4 of the accompanying drawings, a means 50 is there shown that exerts a jam overcoming pressure on the gate valve element 20 when, and only when, such element is in its closed position. The means 50 includes a cam means, embodied as in a collar 51, and a pressure exerting means embodied as in a leaf spring arm 54.

The aforementioned cam means collar 51 is, as is shown in the drawings, in engagement with the transmission train element part, particularly a connecting rod 52 link part thereof. The connecting rod link part 52 is connected to the lower end of the chain 42 and provides, by being connected to the gate valve element 20, linkage connecting the chain 42 to the gate.

Preferably, the cam means collar 51 encloses the shank of the rod 52. Engagement thereof with the connecting rod may be effected, as by a set screw 53 threadably mounted in the collar 51 and adapted when turned down to engage the shank surface of the rod 52. By this provision, the disposition of the collar along the connecting rod part may be easily adjusted and, when so adjusted, be fixed. The importance of this provision will become evident as the description proceeds.

The pressure exerting means arm 54, previously mentioned, has one of its ends 55 fixed, as by suitable fasteners 56 extending into and engaging a bracket 57 mounted on a regulator wall, such as the wall 14 of the gate chamber 18. The bracket 57 supports the arm 54 so the arm extends into the chamber 18 and so that a free end 58 of the arm is positioned in the path through which the collar 51 on the connecting rod 52 moves, in the movement of such rod during the closing and opening of the gate valve element 20.

The end 58 of the arm 54 is bifurcated to form yoke arms 59. The connecting rod 52 extends between and may freely move relative to the yoke arms 59, except when the arms are engaged by the collar 51. As shown in the accompanying drawings, engagement between the collar 51 and the yoke arms occurs only as the connecting rod 52 is moving through the last increment of its downward stroke to allow the gate element 20 to close and in the first increment of its successive upward movement to lift the gate element to begin opening. Through all remaining phases of the reciprocatory movement of the connecting rod, the yoke end 58 of the arm 54 is in a free bearing relation with the rod 52.

By this arrangement, the arm 54 is distorted during the last increment of downward movement of the connecting rod and the gate valve element 20 to close and is thus charged with energy that may be advantageously used to overcome a jam between the gate valve element face 22 and its seating edge 23. The bias, thus exerted by the arm 54 through the collar 51 on the connecting rod 52, will be somewhat abruptly applied, as the sewer flow exits from the float chamber 17 and will collaborate with the float movement in getting the gate valve element into a motion toward opening. Once started, flow from chamber 16 flushes the gate toward opening and the jam producing sediment from its former lodged position.

During the interim between successive closures of the gate valve element, the arm 54 remains undistorted in relaxation for subsequent operation.

Thus, it will be seen that my invention teaches means by which jamming of the gate valve element 20 may be overcome and which may be installed, adjusted and maintained at very low cost.

I claim:
1. In a sewer regulator having
a movable gate mounted for reciprocal substantially vertical movement to and from open and closed positions to thereby regulate sewer flow,
a movable float responsive to the sewer flow by rising and falling and adapted to rise and fall as sewer flow rises and falls, and
a transmission train in engagement with the float and including a connecting rod in engagement with the gate for operatively connecting the float to the gate to cause the gate to rise and open and allowing it to fall and close as the float falls and rises;
the combination therewith of
a collar about and in engagement with the connecting rod and being movable therewith in a reciprocating path to rise when the connecting rod raises the gate and to fall when the connecting rod lowers the gate; and
a spring arm having
one end fixed against movement relative to the connecting rod and
the other end being free to move and in a position along the path of collar movement to be engaged by the collar as the collar moves through a closing phase of a downward stroke and the beginning phase of a successive upward stroke in its reciprocal movement wherefore the spring arm being first distorted during gate closing exerts bias to urge gate opening.

2. In a sewer regulator having
the combination described in claim 1 and in addition thereto having
means in movable engagement with the collar and being operable to engage and disengage the connecting rod to thereby connect and disconnect the collar to the connecting rod wherefore the position of the collar along the connecting rod and with respect to the point of engagement of the collar with the spring arm free end and to the closure of the gate may be adjusted.

3. In a sewer regulator having
a movable gate mounted for arcuate, reciprocal, and substantially vertical movement to and from open and closed positions to thereby regulate sewer flow,
a movable float responsive to the sewer flow by rising and falling and adapted to rise and fall as sewer flow rises and falls, and
a transmission train in engagement with the float;
the combination therewith of
a connecting rod link part in engagement with the gate and the transmission train for operatively connecting the float to the gate to cause the gate to rise and open and allowing it to fall and close as the float falls and rises;
a collar about and in freely slidable engagement with the connecting rod link part and being movable therewith in a reciprocating path to rise when the link part raises the gate and to fall when the link part lowers the gate;
a set screw in threaded engagement with the collar and supported thereby for radial movement relative thereto and adapted when turned down to engage the link part and lock the collar thereto and when turned up to release the collar for adjustment along the link part;
a spring arm;
a bracket in engagement with one end of the spring arm and adapted to fix such end against movement; and
the other end of the spring arm having bifurcated arms forming a yoke slidably enclosing the link part and in a position along the path of collar movement to be engaged by the collar as the link part and collar move through a closing phase of a downward stroke to allow the gate to close and the beginning phase of a successive upward stroke to open the gate wherefore the spring arm, being first distorted during gate closing, exerts bias to urge gate opening when the gate is closed.

References Cited in the file of this patent
UNITED STATES PATENTS

| | | |
|---|---|---|
| 107,605 | Foster | Sept. 20, 1870 |
| 580,294 | Stone | Apr. 6, 1897 |
| 1,015,980 | Robbins | Jan. 30, 1912 |